(12) United States Patent
Fa

(10) Patent No.: US 6,873,137 B2
(45) Date of Patent: Mar. 29, 2005

(54) ENERGY GENERATOR

(76) Inventor: George Fa, 400 Bentley #6, Markham, ON (CA), L3R 8H6

(*) Notice: Subject to any disclaimer, the term of this patent is extended or adjusted under 35 U.S.C. 154(b) by 74 days.

(21) Appl. No.: 10/435,705

(22) Filed: May 12, 2003

(65) Prior Publication Data
US 2004/0228154 A1 Nov. 18, 2004

(51) Int. Cl.[7] .......................... H02H 7/06; H02M 7/537
(52) U.S. Cl. ........................................ 322/28; 363/131
(53) Field of Search .............................. 363/95, 97, 98, 363/131, 132; 322/22–25, 27, 28, 37, 88; 191/4, 5

(56) References Cited

U.S. PATENT DOCUMENTS

| | | | |
|---|---|---|---|
| 3,530,356 A | 9/1970 | Aronson | |
| 3,972,380 A | 8/1976 | Hudson | |
| 4,082,988 A | 4/1978 | Reime | |
| 4,095,665 A | 6/1978 | Armfield | |
| 4,099,589 A | 7/1978 | Williams | |
| 4,222,450 A | 9/1980 | Febbs | |
| 4,254,843 A | 3/1981 | Han | |
| 4,298,082 A | 11/1981 | Ramos | |
| 4,300,088 A | 11/1981 | Hicks | |
| 4,438,342 A | 3/1984 | Kenyon | |
| 4,477,764 A | 10/1984 | Pollard | |
| 4,597,463 A | 7/1986 | Barnard | |
| 4,839,576 A * | 6/1989 | Kaneyuki et al. | 322/25 |
| 5,859,525 A * | 1/1999 | Minks | 322/94 |
| 6,204,643 B1 * | 3/2001 | Kouwa et al. | 322/28 |
| 6,333,620 B1 | 12/2001 | Schmitz | |
| 6,464,026 B1 | 10/2002 | Horsley | |
| 6,476,509 B1 | 11/2002 | Chen | |
| 6,614,130 B2 * | 9/2003 | Wilhelm | 307/11 |

* cited by examiner

Primary Examiner—Matthew V. Nguyen

(57) ABSTRACT

An energy generator using transistors to amplify current and use some of its energy to prolong the life of its battery.

4 Claims, 7 Drawing Sheets

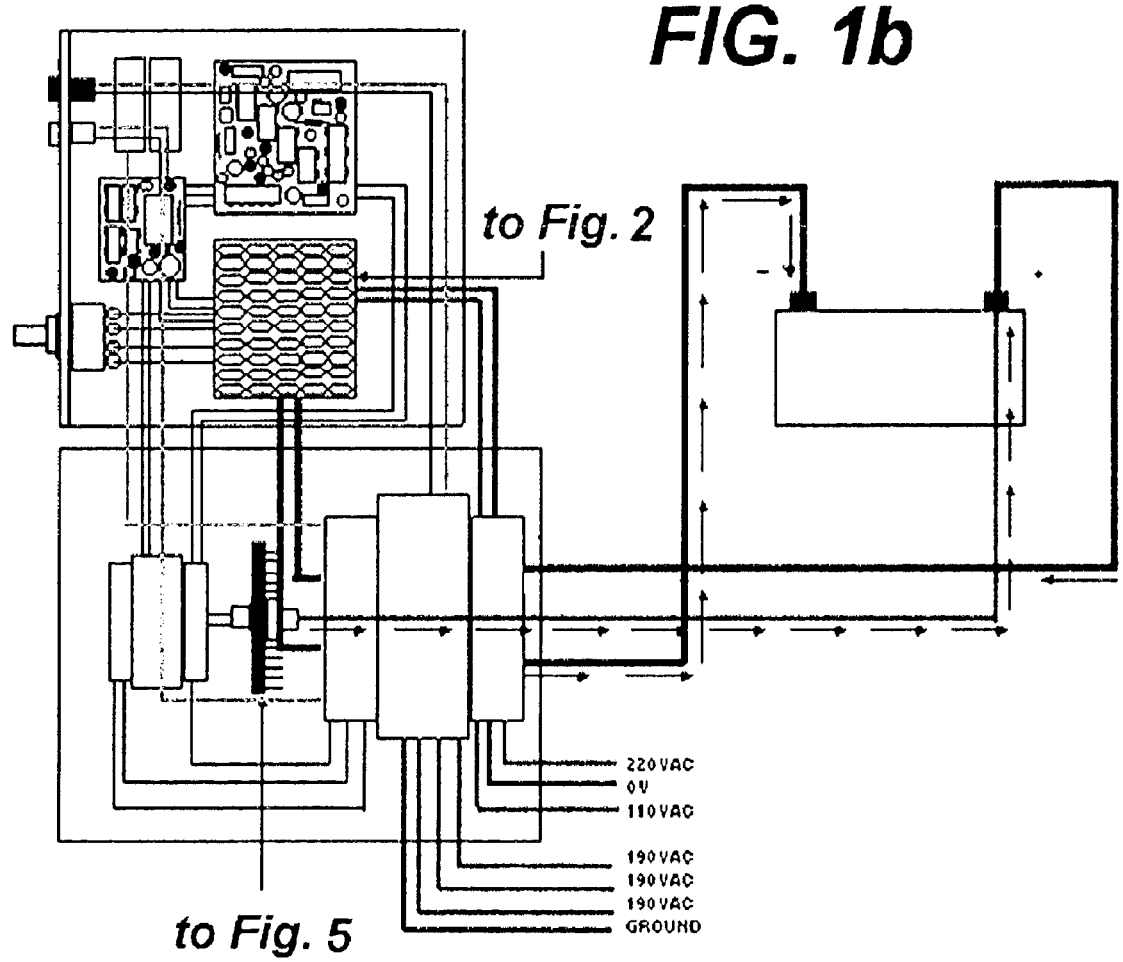

ENERGY GENERATOR

BACKGROUND OF THE INVENTION

1. Field of the Invention

This invention relates generally to electrical generator but more particularly to a generator which optimizes the lifespan of a battery to extend its useful life.

2. Background

Over the years a number of energy generators in the form of battery rechargers have been developed. Generally, they are directed towards electrically propelled vehicles.

U.S. Pat. No. 3,530,356 discloses a regenerator system for electric vehicles. The system includes an alternator (162) which produces alternating current voltage. A rectifier (164) may be included in the alternator in order to provide current for recharging batteries. A voltage regulator (172) operates as a safety device to prevent damage to the batteries by overcharging.

U.S. Pat. No. 3,972,380 presents a vehicle with regenerative power system. The vehicle includes a pair of alternators (44) serially connected to a regulator (68) in order to recharge batteries.

U.S. Pat. No. 4,082,988 describes an electric power plant for motor driven vehicles. The system presents motor/generator units (11, 12), an AC capacitor (18) and a logic control and pulse generator unit (22).

U.S. Pat. No. 4,095,665 exposes an electric vehicle, in which a generator serves to charge the batteries that drive the motor when the vehicle is to be decelerated.

U.S. Pat. No. 4,099,589 discloses a DC electric car with auxiliary power and AC drive motor. The system offers an AC generator, a rectifier, a DC battery and an AC motor.

U.S. Pat. No. 4,222,450 presents an electrical drive for automobiles. The drive includes alternators (46, 48), rechargeable batteries (50, 52), voltage regulators (61, 62) which are set to cause recharging at any given drop in battery voltage.

U.S. Pat. No. 4,254,843 describes an electrically powered vehicle. An engine/generator unit (66, 98) is powered by a whirl ventilator system. The unit is started to charge the batteries when the level of charge therein has dropped below a predetermined level. The system includes a voltage regulating resistor (158) and transformer (142) for full wave rectification.

U.S. Pat. No. 4,298,082 discloses an electric propulsion system for wheeled vehicles. The system includes a generator (31) which is coupled by a diode (121) to the electrical circuit. A silicon controlled rectifier (124) is used to control excitation of the generator.

U.S. Pat. No. 4,300,088 presents an electric charging apparatus for ground vehicles. The apparatus includes alternators (2, 4, 51), stators (S1, S2), rectifiers, a survoltage regulator and a voltage comparator.

U.S. Pat. No. 4,438,342 describes a novel hybrid electric vehicle, where the output of the alternator (34) goes through a semiconductor rectifier (40).

U.S. Pat. No. 4,477,764 exposes an energy and storage system for an electric vehicle. The system includes alternators (25, 26) and charging internal diode rectifiers.

U.S. Pat. No. 4,597,463 discloses an electric vehicle. The system includes generators (48, 82, 78, 34) linked to a voltage regulator (64), a DC to AC converter (52), a DC volt regulator (54), a chopper converter (56) and a transformer (60), all used to recharge batteries.

U.S. Pat. No. 6,333,620 presents a series type hybrid electric vehicle. The vehicle includes a generator (310), a generator controller (320) an insulated gate bipolar transistors.

U.S. Pat. No. 6,464,026 describes a control system for parallel hybrid vehicles. The system includes an electronic motor/generator (20), an inverter (24), a battery (22), a motor controller (42) and ammeters (66,67).

U.S. Pat. No. 6,476,509 finally discloses a mobile AC power system including an alternator (10) linked to a transformer (80), a circuit breaker (132), a frequency changer (82) and a voltage controller (138).

SUMMARY OF THE INVENTION

It is an object of this invention to provide for a battery recharger conceived for general purpose, including use on electrically propelled vehicles.

In order to do so, the generator uses transistors to increase the current flow in order to provide additional energy to be used as a power source as well as energy to recharge the battery.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE PREFERRED EMBODIMENT

FIG. 1a The circuit in general with arrows pointing in the direction of the current coming from the battery and being used to power electric appliances.

DETAILED DESCRIPTION OF THE PREFERRED EMBODIMENT

Figure 1A:
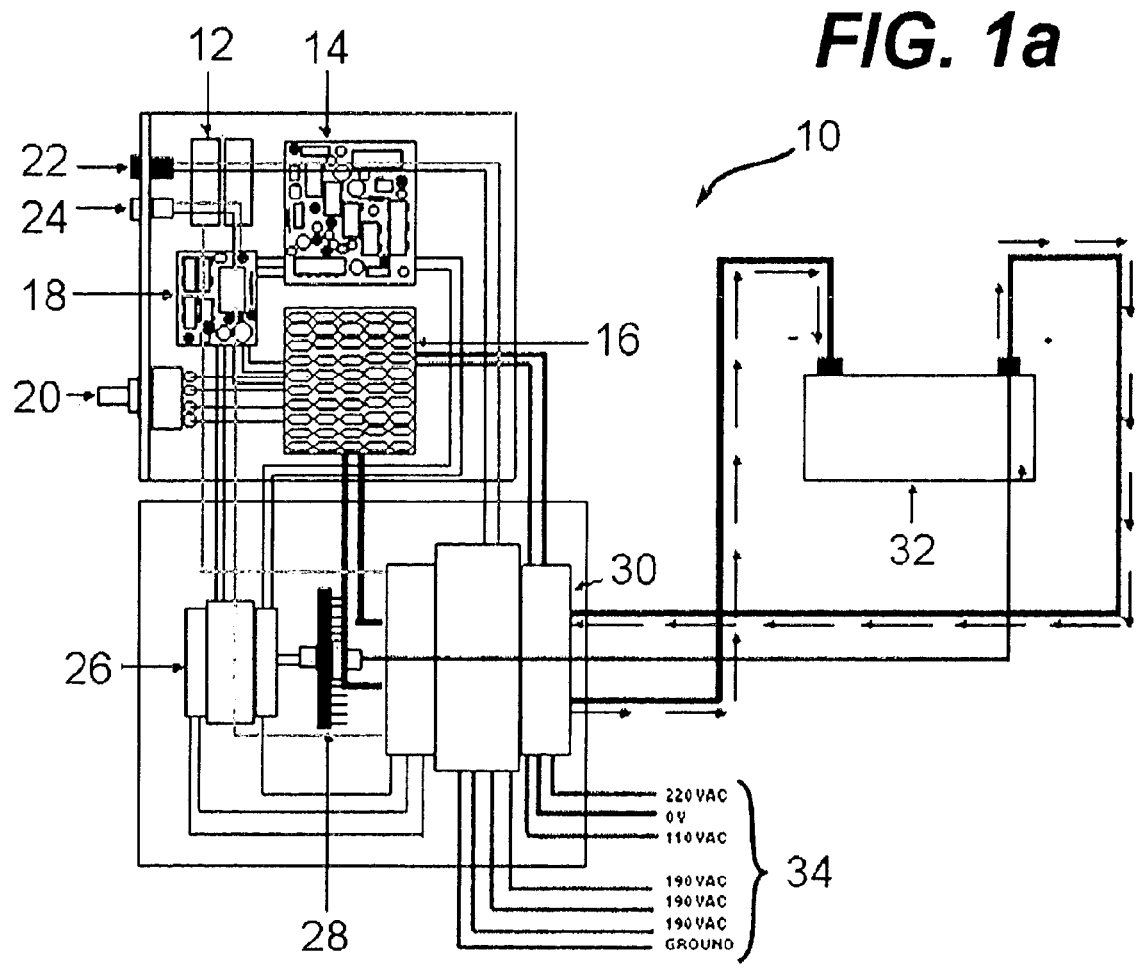
FIG. 1b Shows current going into the recharging circuit used for recharging the battery.
Figure 2:
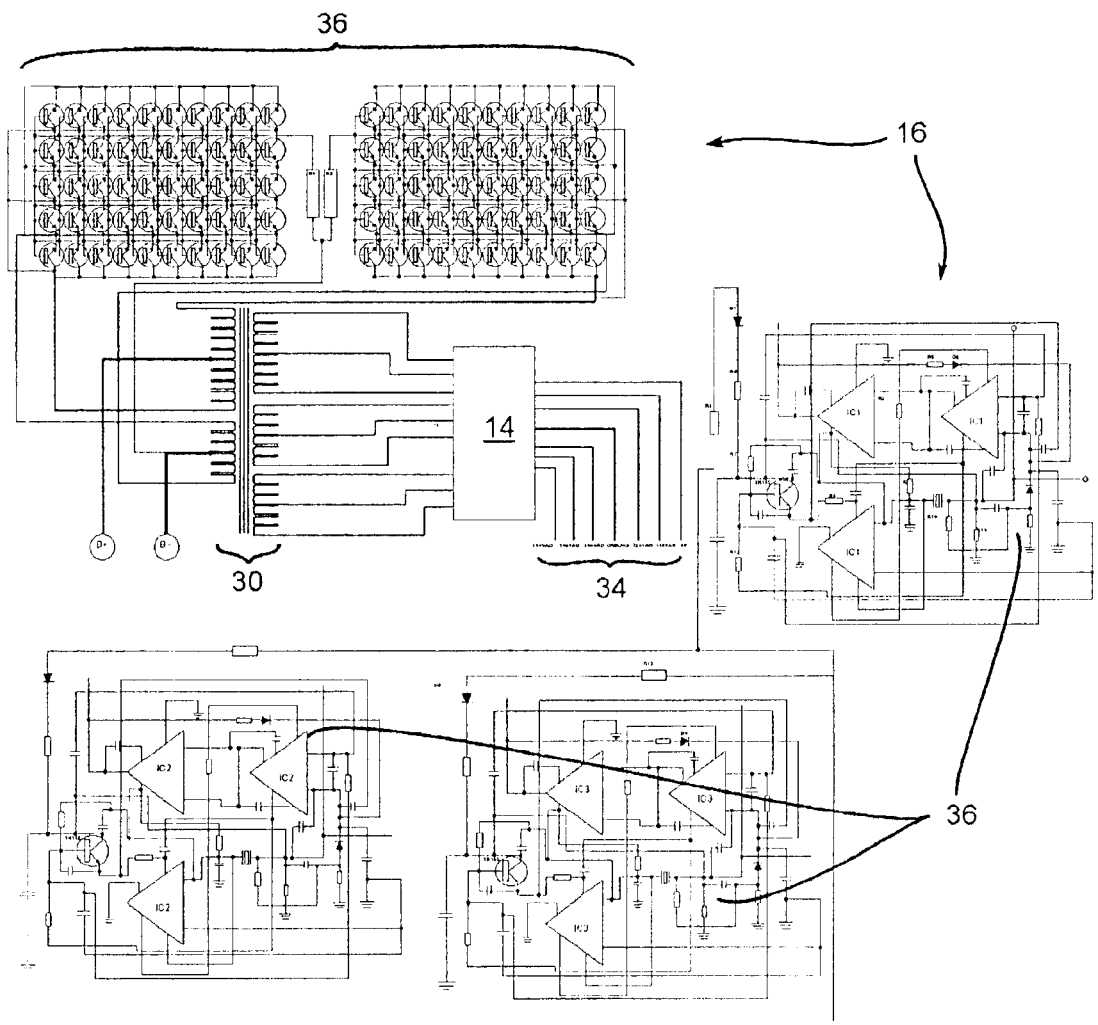
FIG. 2 Shows the part of the circuit containing the amplifying transistors.

FIG. 1a An energy generator (10) consists of a main electronic circuit having circuit protection resistors (12), a voltage regulator circuit (14) to regulate the voltage as is known in the art, a transistor generating circuit (16) further described in FIG. 2, power on switch (20), power on light (22), charging light (24). A charging transformer (26) sends current through a diode with heat sink (28) further described in FIG. 5 as well as a battery recharging circuit (18), which recharges a battery (32), while a larger transformer (30) provides the AC output (34) that supplies power to appliances. The arrows indicate the direction of the current coming from the battery (32) and being used to power electric appliances. In FIG. 1b The same circuit shows arrows pointing the direction of the current that goes into the battery recharging circuit (18), used for recharging the battery (32).

Figure 3:
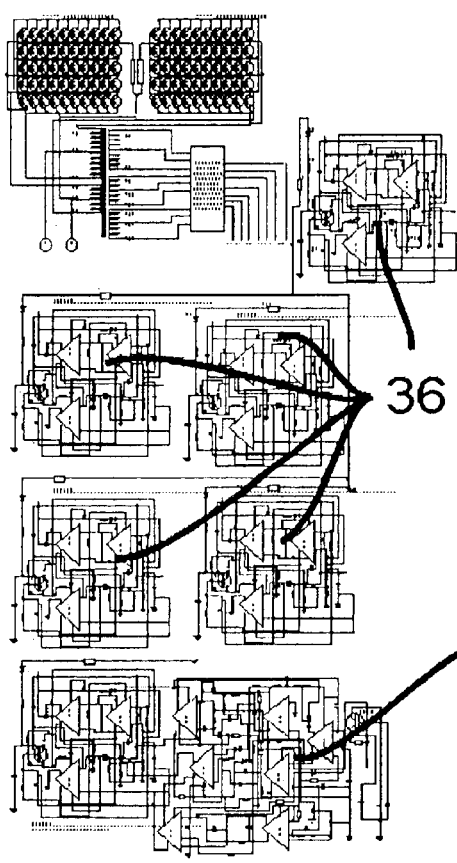
FIG. 3 Shows the entire circuit generally.
Figure 3:
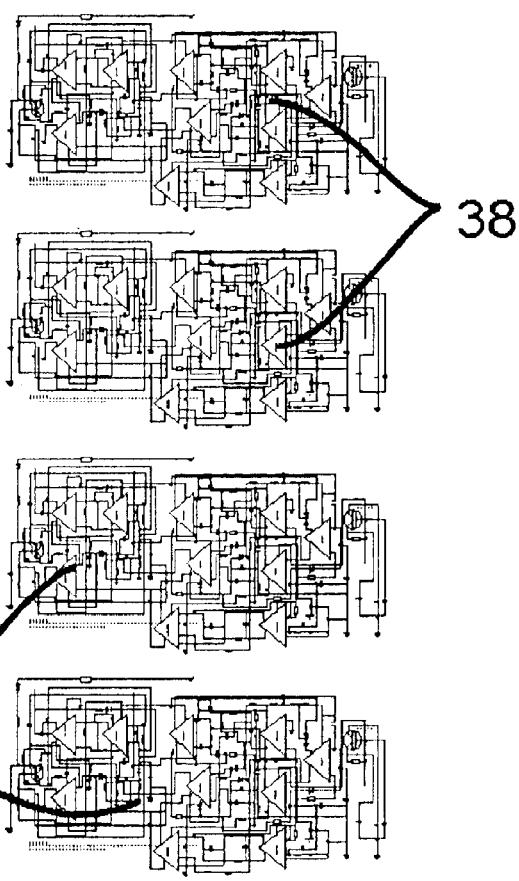

FIG. 2 The transistor circuit (16) consists of two banks of transistors (34) each comprised of a plurality of transistors and a series of redundant IC circuits (36) which are repeated several times as can be seen in FIG. 3 where there are five redundant IC circuits (36) followed by 5 more complex IC circuits (38) wherein current amplification occurs.

Figure 4:
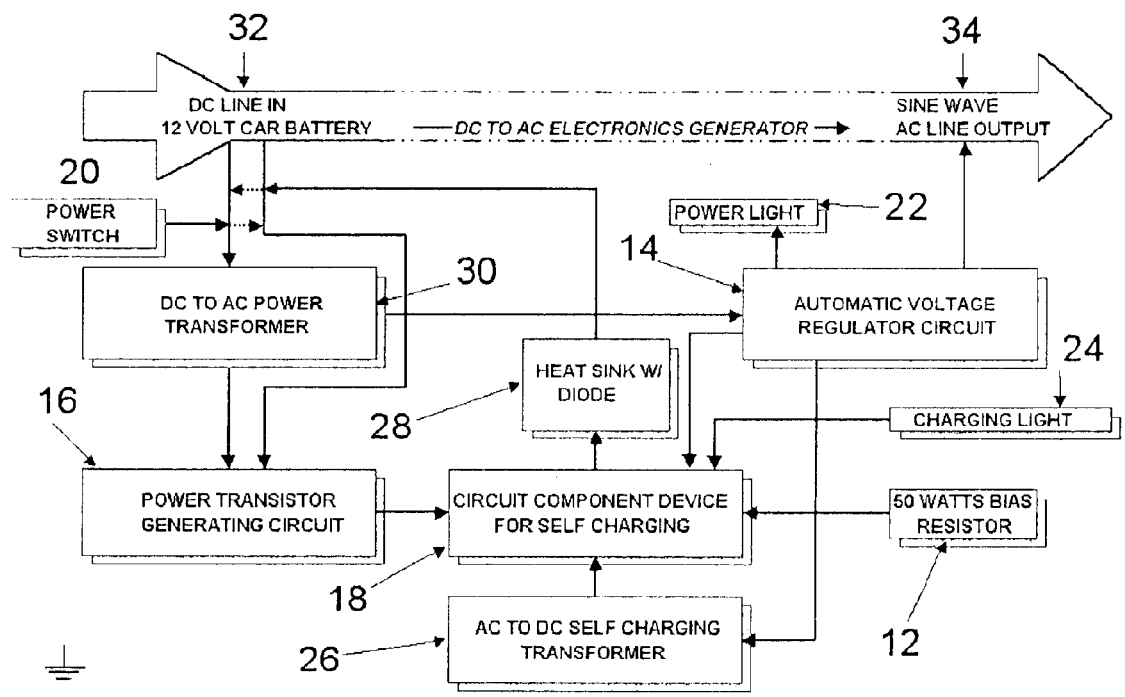
FIG. 4 Is a schematic of the sequence.

FIG. 4 Power from the battery (32), after having been converted from DC to AC goes through the larger transformer (30) which brings its voltage to the range of 110–220 VAC. Power is then passed through the voltage regulator circuit (14) before being released through the AC output (34) as well as onto the charging transformer (26), the battery recharging circuit (18) and then the diode with heat sink (28). Power from the battery is also passed through the transistor generating circuit (16) which then goes into the battery recharging circuit (18).

Figure 5:
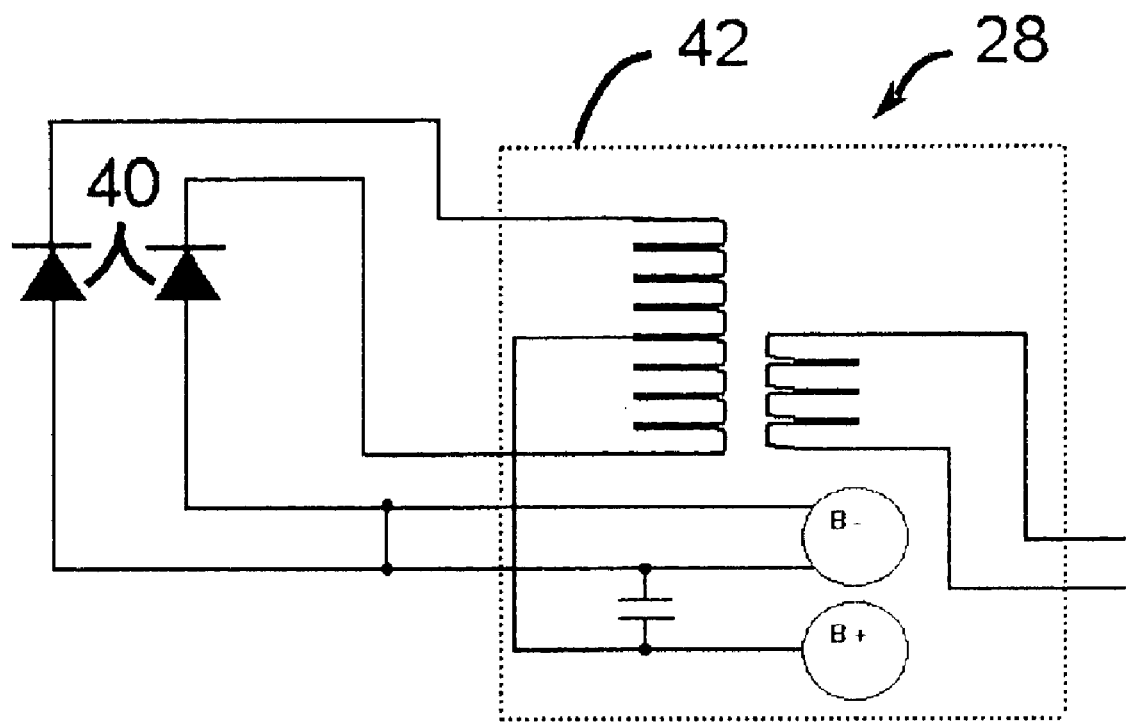
FIG. 5 Shows the charging part of the circuit.

FIG. 5 Shows the charging circuit (28) with its diodes (40) and heat sink (42) which is connected to the output of the circuit to turn DC into AC (14).

Figure 6:
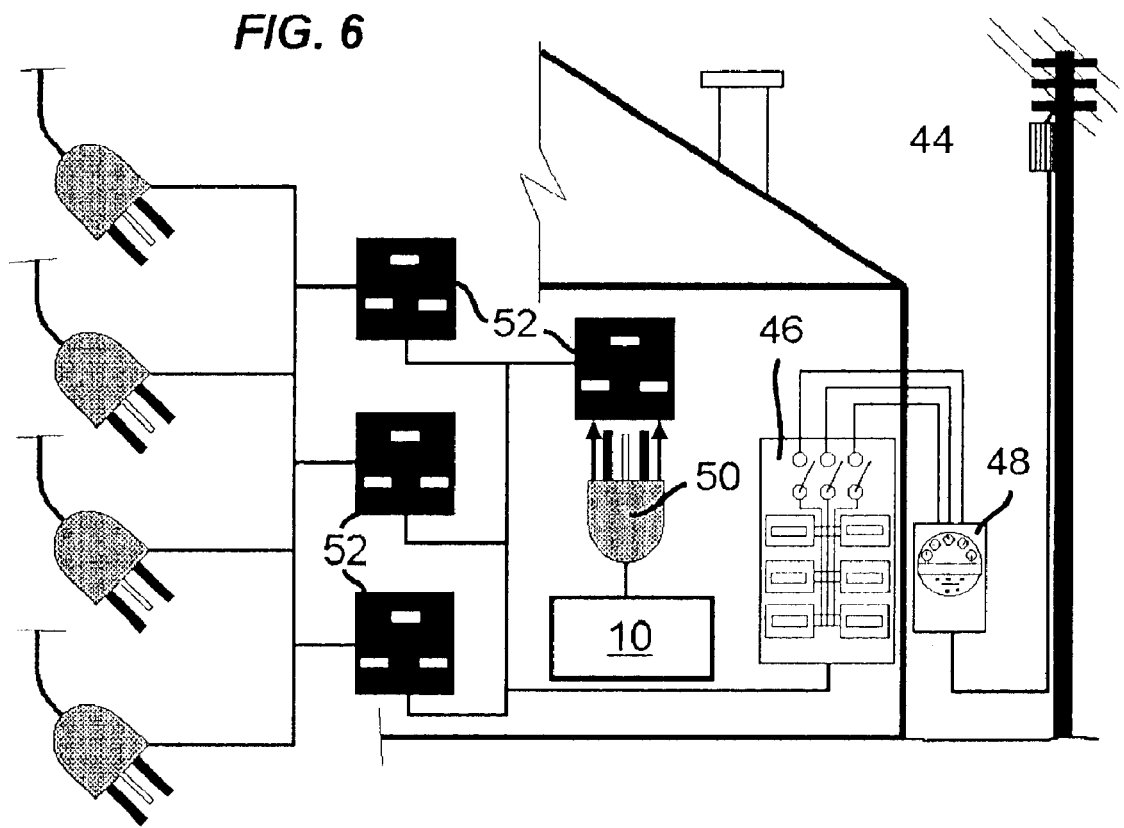
FIG. 6 Shows the energy generator in a residential environment.

FIG. 6 In a household environment (44), the energy generator (10) is independent from the main circuit breaker (46) and provides power in case of a power outage by having a plug (50) connected into at least one outlet (52) which then runs through to other outlets (52) in order to provide power to a household electrical circuit. The energy generator (10) can also be used on an electric vehicle.

What is claimed is:

1. An energy generator comprising:

a circuit to turn DC into AC , a transistor circuit, a battery recharging circuit, a charging transformer, a larger transformer, a voltage regulator circuit;

said transistor circuit comprising two banks of transistors and a series of redundant IC circuits wherein current amplification occurs.

2. An energy generator having the following mode of operation:

Power from a battery is converted from DC to AC and voltage boosted by a larger transformer;

said power further passing through a voltage regulator circuit and through an AC output;

said power also passing through said voltage regulator circuit and through a charging transformer and further into a battery recharging circuit;

power from said battery also passing through a transistor generating circuit followed by said battery recharging circuit.

3. An energy generator as in claim 1 and 2 wherein:

the output voltage is between 110 and 220 VAC.

4. An energy generator as in claim 1 and 2 wherein:

said energy generator is used on an electric vehicle.

* * * * *